July 11, 1939.    F. W. SULLINGER    2,166,100
DIRECTION FINDER
Filed April 8, 1937    2 Sheets-Sheet 2
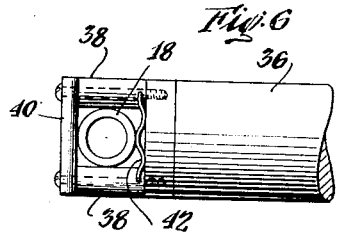
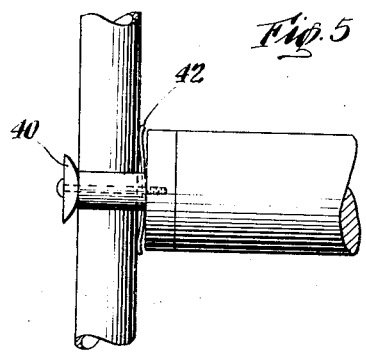
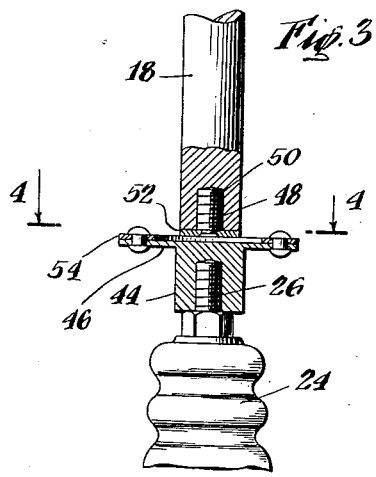
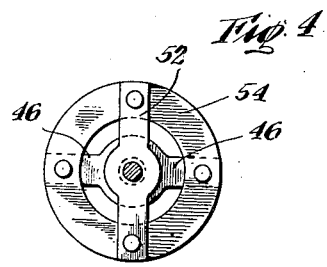
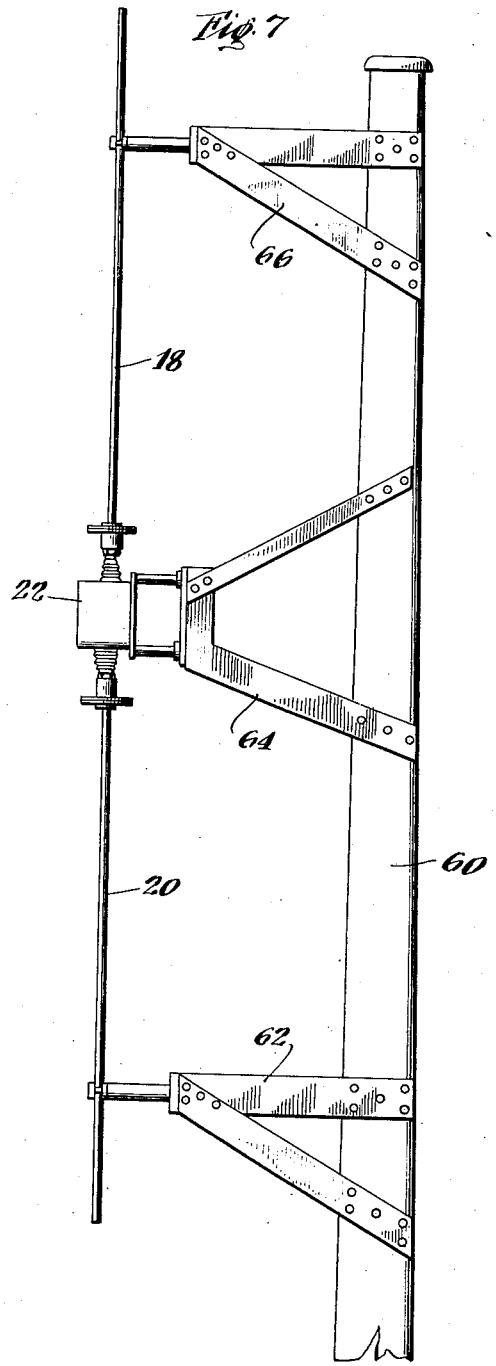
INVENTOR
*Ferris W. Sullinger*
BY
*Hoguet, Neary & Campbell*
his ATTORNEYS Patented July 11, 1939

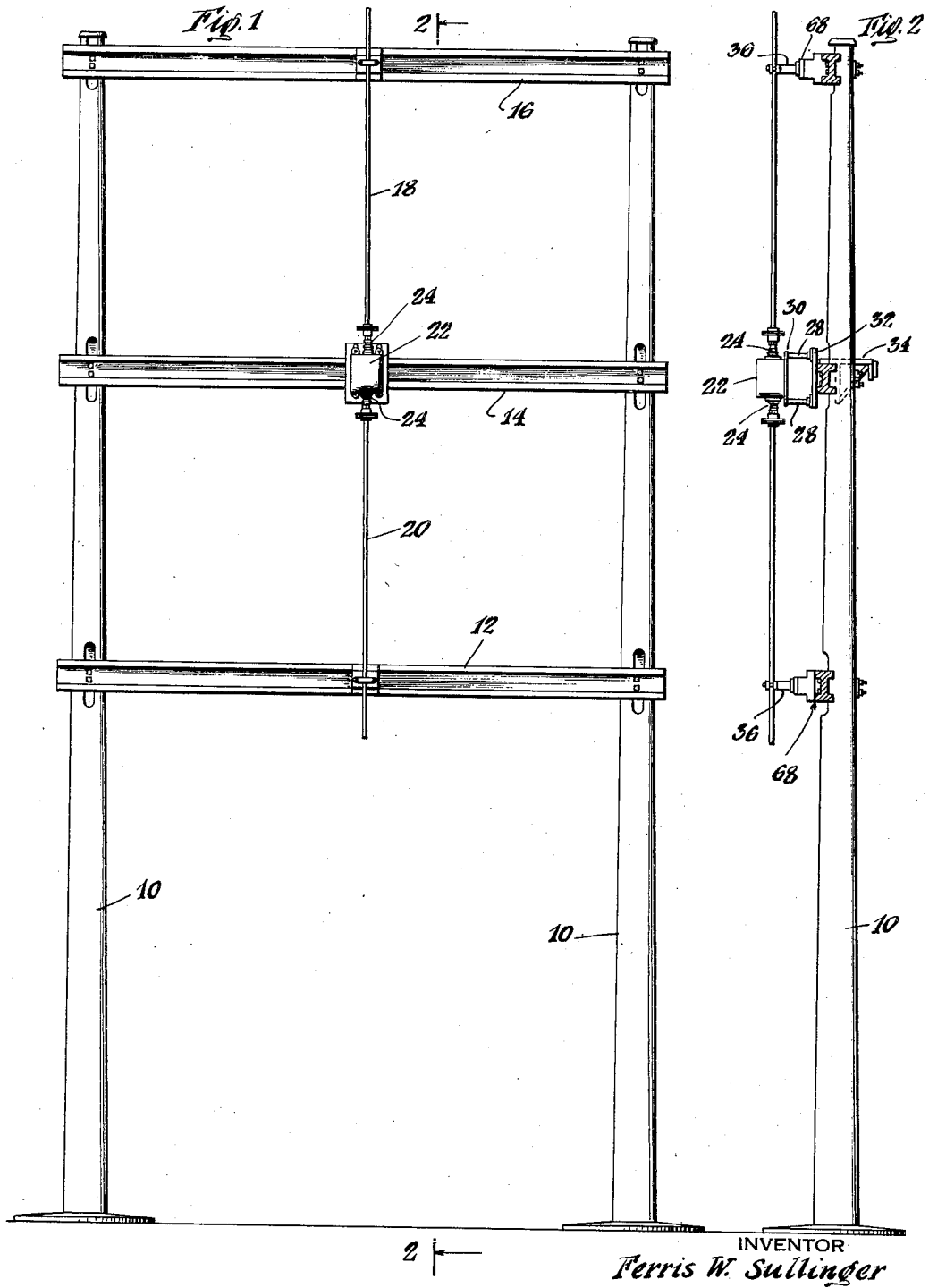

2,166,100

UNITED STATES PATENT OFFICE 2,166,100

DIRECTION FINDER

Ferris W. Sullinger, Coral Gables, Fla., assignor to Pan American Airways Corporation, Jersey City, N. J., a corporation of Delaware Application April 8, 1937, Serial No. 135,650

9 Claims. (Cl. 250—33)

This invention relates to mountings or supports for vertical antennae and has particular applicability to the spaced dipole antennae of the improved radio direction finder disclosed in copending application Serial No. 124,108, filed jointly by Hugo C. Leuteritz and myself on February 4, 1937.

This improved direction finder according to a preferred embodiment, has oppositely positioned vertical dipole assemblies connected together in phase opposition by means of transposed transmission lines; each dipole assembly having an upper and a lower arm connected through a matching transformer, and a variable condenser connected thereto for balancing the capacity of one dipole assembly with that of the opposite dipole assembly. The dipoles are preferably located at a sufficient height above ground to render negligible the natural difference in capacity between the upper dipole arm and ground and that between the lower dipole arm and ground. When the capacities of the upper and lower arms of each dipole assembly have been balanced and the over all capacities of opposite dipole assemblies have been balanced in the above manner, the radio direction finder will give accurate indications of the direction of arrival of the signal waves received by the dipoles and accordingly the direction of the station from which these waves were transmitted. For efficient operation of the direction finder it is necessary to maintain this accurate capacity balance at all times.

I have found that the desired capacity balance of the direction finder, described above, will not be maintained under varying weather conditions unless the dipole assemblies are properly mounted. It is necessary to so arrange the antennae supports that changeable weather conditions will not effect appreciable capacity variations between the supports and the arms of the dipole assemblies.

From field tests that I have made, I have found that when the antennae assemblies are located at relatively short distances from and substantially parallel to the poles or vertical supports, wetting of these supports, caused by wet weather, increases the capacity between the vertical supports and the antenna arms, which results in two capacities in series and a reflected capacity along the antenna assembly. This changes the capacity of the dipole from that originally established and when opposite dipole supports become wetted to a different degree, the desired capacity balance between opposite dipole assemblies is upset, resulting in inefficient operation of the direction finder.

An object of the present invention is to provide antenna supports having such relationship to the antenna that no appreciable change of capacity is introduced into the antenna system by a change in weather conditions.

A further object of the invention is to provide antenna supports that can be readily set up and when assembled will maintain the antenna in a properly balanced relationship.

The invention includes supports for the several elements of a vertical antenna system which supports are preferably non-conductors and introduce no capacity effect into the antenna system and are spaced at such intervals with respect to the antenna elements that a change in their condition from non-conductors to conductors will not vary appreciably the capacity of the antenna elements.

The invention further includes means for mounting the antennae in such a manner that the elements thereof can be accurately spaced angularly and spaced equi-distantly from the center point of the direction finder after the supports are positioned. Also, the mounting for the antenna elements is so constructed that warpage or other slight misalignment of the parts during use will not cause any breakage of parts or upset the capacity balance between the antenna assemblies.

More specifically, the supports may consist of one or more vertical non-conductor poles and attached laterally extending non-conductor members for supporting the vertical antenna assemblies a sufficient distance from the poles so that no appreciable variation in capacity is caused by changes in the wet and dry conditions of the poles. The vertical antennae are positioned at substantially right angles to their supporting laterally extending members, whereby the capacity between the antennae and these lateral supports is a minimum. The antenna assemblies may be supported at a sufficient height from the ground to avoid changes in capacity of the antenna elements with changes in the radio frequency ground level under varying weather conditions.

For a better understanding of the invention, reference may be had to the accompanying drawings in which:

Figure 1 is a front view of one form of antenna support embodying the present invention;

Figure 2 is a sectional view taken on line 2—2 of Figure 1;

Figure 3 is an enlarged view partly in section and partly broken away of a flexible connection between the dipole arms and the housing for the matching transformer and balancing condenser;

Figure 4 is a sectional view taken on line 4—4 of Figure 3;

Figure 5 is a fragmentary side elevation of a mounting for an antenna arm;

Figure 6 is a plan view of the antenna arm mounting shown in Figure 5; and

Figure 7 is a side view of a modified form of antenna support.

One form of the invention illustrated in Figures 1 and 2 consists of spaced upright poles 10 preferably of non-conductive material such as wood, having vertically spaced crossbars 12, 14 and 16. The crossbars 12, 14 and 16, which are of light weight, non-conducting material such as wood and preferably I-shaped in cross-section, may be bolted or otherwise secured to the vertical poles 10. The poles and crossbars may be painted, waterproofed or otherwise treated to increase their life and reduce variations in their condition due to wet or dry weather.

When used with a spaced fixed antenna system, such as for example one of the Adcock type, the supports above described are set up as accurately as possible at 90° spacings and at equal radial distances from a common center so as to form pairs of 180° equally spaced constructions.

The poles 10 may be about 40 feet high and are preferably at least 18 feet apart. A spacing of 30 feet between the poles 10 of each structure is entirely satisfactory under all conditions of wet or dry weather, in that antenna assemblies supported midway between the poles 10 will not have their capacities changed appreciably by the variation in the weather conditions. Also, by providing poles of comparatively great height, which permits mounting of the antenna assemblies at a relatively great height above ground, as above described, variation in the level of radio frequency ground will not produce any appreciable change in capacity between the arms of the dipoles and the ground.

A dipole assembly of the type disclosed in my copending application Serial No. 124,108, supra, may be fixed to each of the supporting structures in the following manner:

Each of the dipole assemblies may suitably consist of vertical arms 18 and 20 electrically connected to a variable condenser and matching transformer mounted in a housing 22. The specific construction of the condenser and transformer arrangement forms no part of the present invention. Suitable insulated leads may connect the arms 18 and 20 with the devices in the housing 22.

One form of this construction consists of insulators 24 fixedly mounted on the housing 22 and having conductor rods 26 extending therethrough as best shown in Figure 3. The housing 22, insulators 24 and conductor rods 26 may be supported on the transverse arm 14 in any suitable manner and as shown particularly in Figure 2, may be supported on insulators 28 extending between plate 30 on the back of the housing 22 and a plate 32 fixed to the I-beam 14. As the housing 22 and the elements contained therein may be comparatively heavy, their weight may be counterbalanced by means of a rearwardly extending counterbalancing weight 34 to prevent twisting and warpage of the crossbar 14.

Expansion and contraction of the rods 18 and 20 is unavoidable under changes in temperature and as a consequence, it is desirable to allow them to have movement relative to the crossbars 12 and 16. A suitable construction for holding the antenna rods 18 and 20 consists of an insulator 36 mounted on each of crossbars 12 and 16 and having spaced sleeves 38 bolted to the outer end thereof which closely receive the rods 18 and 20. The rod may be retained between the sleeves 38 by means of a strip 40 bridging the ends of the sleeves 38. The rods 18 and 20 may be retained against movement due to wind by means of a resilient friction plate 42 mounted between the end of the insulator 36 and the antenna rod 18 or 20.

The rods 18 and 20 may also be flexibly connected to the conductor rods 26 through a flexible connection such as is disclosed in Figures 3 and 4 to allow the assembly to bend without breaking if the crossbars 12, 14 and 16 warp or when subjected to the force of strong winds. This flexible connection may consist of an internally threaded hub 44 having a flexible arm 46 thereon. The antenna rods 18 and 20 may be provided with a threaded bore 48 in the ends adjacent the housing 22 for receiving the threaded stud 50 carrying flexible arm 52. The arms 52 and 46 are arranged at right angles to each other and are connected by means of an annular ring 54. This assembly permits a bending motion between the conductor rods 26 and the antenna rods 18 and 20 without setting up any undue stress in insulator 24.

Thus, upon warpage of any of the crossbars 12, 14 and 16, the rods may flex relative to the housing 22 without stressing unduly insulator 24 and without binding in their sliding supports; and they may likewise expand or contract without binding relative to the cross-bars 12 and 16.

Accurate spacing of the antenna assemblies from the midpoint of the system may be achieved by introducing suitable shims 68 beneath the base of the insulators 28 and 36 or beneath the blocks on which these insulators are mounted. The accurate 90° spacing between antenna elements may be achieved through the use of the ordinary surveyor's transit to adjust them along the bars 12, 14 and 16 into their proper position.

A modified form of supporting construction is disclosed in Figure 7. This construction consists of but one supporting pole 60 provided with suitable triangular brackets 62, 64 and 66 upon which the antenna assembly like that previously described, may be supported in a like manner. The brackets 62, 64 and 66 are preferably not less than 9 feet in length thereby supporting the antenna assembly at least 9 feet away from the pole 60. It has been found that this minimum spacing is sufficient to avoid appreciable capacity changes between the rods 18 and 20 and the supporting pole 60. Therefore, when the antenna assemblies are supported in their final position, changes in weather condition and in the conductive characteristics of the poles will not appreciably change the capacity of the assemblies. It will be understood that the type of supporting construction shown in Figures 1 and 2 offers advantages over the construction shown in Figure 7 particularly because of its greater resistance to horizontal forces, such as wind, applied from the side. Also, the size and weight of the horizontal supporting members, in Figures 1 and 2, may be appreciably less than those in Figure 7 since the former are supported at both ends.

It will be understood that there can be many modifications made in the disclosed construction without departing from the inventive concept. Therefore, the above described embodiments should be considered as illustrative only and not as limiting the scope of my invention.

I claim:

1. In a supporting structure for vertical antennae, the combination of a vertical supporting element, vertically spaced laterally extending supporting members on said element, a vertical antenna mounted on said supporting members, means for fixing a portion of the antenna spaced from the upper end thereof to one of said members, and means for movably connecting another portion of the antenna to another supporting member, said supporting members maintaining the entire antenna spaced from the supporting element sufficiently to avoid variable capacity effects between the supporting element and the antenna.

2. In a supporting structure for vertical antenna, the combination of a pair of spaced vertical poles, vertically spaced transverse supporting members connected to said poles, a vertical antenna element mounted substantially at the midpoint of said transverse supporting members, means for fixedly connecting a part of the antenna element spaced from its upper end to one of said transverse members, and means on another transverse member frictionally engaging a portion of the antenna element to normally support but allow expansion and contraction of the antenna element, said supporting members maintaining the antenna element spaced sufficiently from both the poles to avoid variable capacity effects between the poles and the antenna element.

3. In a supporting structure for vertical antenna assemblies having vertically spaced arms connected through a capacity balancing device, the combination of a vertical pole, vertically spaced laterally extending supporting members on said pole, means for movably mounting said antenna arms on certain of said supporting members and means for fixedly mounting said capacity balancing device on another of said supporting elements, the entire antenna assembly being spaced from said pole sufficiently to avoid variable capacity effects between the antenna arms and said pole.

4. In a supporting structure for vertical antenna assemblies having vertically spaced arms connected through a capacity balancing device, the combination of a pair of spaced vertical poles, vertically spaced transverse supports connected to said poles, means for fixedly connecting said capacity balancing device to one of said transverse supports, and means for movably connecting the antenna arms to other transverse supports, the antenna assemblies being mounted substantially at the midpoints of said supports and being spaced from said poles sufficiently to avoid variable capacity effects between the poles and the antenna arms.

5. In a dipole antenna assembly the combination of spaced vertical antenna rods, capacity balancing means between the adjacent ends of said rods, and mechanically flexible means for electrically connecting the rods to the capacity balancing means, comprising a hub on each of said rods, laterally projecting flexible arms on said hubs, similar opposed hubs on and electrically connected to said balancing means, flexible arms projecting from the last named hubs substantially perpendicular to the arms on said rods, and a ring member connected to arms of each of the rods and the opposed arms on said balancing means.

6. In a supporting structure for vertical antenna, the combination of a vertical pole, vertically spaced laterally extending supporting members on said pole, insulators extending from said supporting members, a vertical antenna element mounted on said insulators, means for fixing an intermediate portion of the element to one of said insulators, means frictionally engaging and movably connecting the element to another of said insulators, and shims forming a part of said insulators for varying the spacing of and aligning said antenna element, the supporting members maintaining entire antenna element spaced from the pole sufficiently to avoid variable capacity effects between the pole and the element.

7. A supporting structure for direction finder dipole assemblies having spaced substantially rigid arms and a capacity balancing device comprising, spaced vertical non-conducting supports, a plurality of spaced horizontal non-conductor supports fixed to said vertical supports, means for mounting said capacity balancing device on one of said horizontal supports, means for movably connecting said arms to other horizontal supports substantially at right angles thereto and flexible couplings between said capacity balancing device and said arms allowing flexing of the assembly and maintaining alignment of its integral parts under substantially all weather conditions, said connecting means and flexible couplings permitting relatively small movements of the dipoles which are not harmful to the electrical balance of the dipole assembly and do not cause harmful stresses in any part of the dipole assembly.

8. In a direction finder, a dipole assembly and supporting construction therefor comprising spaced vertical non-conducting supports, a plurality of spaced horizontal non-conducting supports fixed to said vertical supports, a dipole assembly comprising an upper and lower vertical arm and a capacity balancing device, means flexibly interconnecting electrically and mechanically said upper and lower arms with said capacity balancing device, means movably connecting the upper and lower arms to spaced horizontal supports and means fixedly connecting the capacity balancing device to another horizontal support, the means connecting said arms to said horizontal supports permitting expansion and contraction of said vertical arms and the flexible interconnecting means permitting slight misalignment of said arms with respect to said capacity balancing device without causing any deleterious effects in said assembly.

9. In an antenna assembly, the combination of a vertical rod, a support for the rod, and mechanically flexible means for electrically connecting the rod to the said support comprising a hub on the rod, a laterally extending flexible member on the hub, a similar opposed hub on the said support electrically connected to said support, a laterally extending flexible member on the last named hub substantially perpendicular to the said rod flexible member, and a ring member connecting the rod flexible member and the support flexible member, said flexible members and ring being electrical conductors.

FERRIS W. SULLINGER.